Patented Feb. 13, 1923.

1,445,544

UNITED STATES PATENT OFFICE.

THEODOR ODINGA, OF BASEL, SWITZERLAND, ASSIGNOR TO ELEKTRIZITÄTSWERK LONZA, OF GAMPEL, CANTON OF VALAIS, AND BASEL, SWITZERLAND.

PROCESS FOR THE MANUFACTURE OF CROTONIC ACID FROM CROTONALDEHYDE.

No Drawing. Application filed June 14, 1921. Serial No. 477,562.

*To all whom it may concern:*

Be it known that I, THEODOR ODINGA, a citizen of the Swiss Republic and resident of Basel, Switzerland, having invented a new and useful Process for the Manufacture of Crotonic Acid from Crotonaldehyde, of which the following is a full, clear, and exact specification.

From the literature (Kekulé, Liebigs annalen 162, page 111, second paragraph) it is known that crotonaldehyde is transformed in the air, by absorption of oxygen, into crotonic acid.

I have found, that this oxidation can be accelerated extraordinarily by catalysis, when a manganic salt is employed as catalyst. For the oxidation of acetaldehyd to acetic acid, there are already employed, according to the German Patent No. 305,550, salts of manganese, as manganous acetate, maganous formate, etc., which dissolve by the action of the aldehyde and of the oxygen with a brown coloration, forming thereby an active maganese compound. The use of this method of formation of acetic acid for the formation of crotonic acid meets with difficulties, for the reason that the crotonic acid, which is oxidizable, is attacked more or less according to the temperature; thereby the active maganese catalyst becomes in time inactive and is regenerated only slowly even at a low temperature and is often not regenerated at all.

Nevertheless I have found that these troubles can be avoided, if one works for instance at ordinary temperature and employs for the oxidation a catalyst formed by a manganic salt soluble in the reaction liquid. Under these conditions no appreciable destruction of the crotonic acid takes place and the catalyst remains undiminished active. As proof of the activity of the catalyst there may be mentioned that the absorption of oxygen is about the tenfold of that which takes place, under the same conditions, when no catalyst is employed.

As catalyst can be employed every manganic salt which is soluble in crotonaldehyde alone or mixed with a convenient solvent. The manganese can be added also in form of manganese salts of lower or higher degrees of oxidation and can be oxidized or reduced in the solution itself to the active degree that is to say a manganic salt by adding convenient oxidizing or reducing agents. Oxygen alone is sufficient to convert a manganous salt into an active manganic compound. But if a manganic salt is used one has an active catalyst from the beginning; manganic acetate is particularly suitable with a solvent such as glacial acetic acid.

*Example.*

For the preparation of the active catalyst 10 gr. of manganous acetate is dissolved in 100 ccm. of glacial acetic acid and to this solution there are added, at about 115° C., by portions, 1.5 gr. of permanganate. The deep-dark-brown solution of manganic salt is diluted for the employ with glacial acetic acid to a manganese content of 1–2 per thousand. For example, 200 ccm. of such an initial solution of 2 per thousand are energetically agitated in a retort of half a liter, while cooling with water, and there are added progressively thereto 150 gr. of crotonaldehyde, while oxygen is passed through the retort. With a good stirring the absorption of oxygen exceeds 20 liters per hour. When no further oxygen is absorbed, the reaction is interrupted and the glacial acetic acid is distilled off, preferably in vacuo, on a water bath. The residue solidifying immediately in the cold can be purified by a distillation in vacuo or by a recrystallization from water. The yield of pure crotonic acid is 98 to 99 per cent. of the crotonaldehyde employed.

Instead of oxygen mixtures of oxygen with indifferent gases can be employed. The crotonic acid and its derivatives are compound capable of reacting, which may be employed to the most various syntheses. Technically valuable is for instance the butyric acid, which can be prepared therefrom by reduction.

What I claim is:—

The herein described process for the manufacture of crotonic acid from crotonaldehyde, consisting in oxidizing with oxygen crotonaldehyde diluted with glacial acetic acid at ordinary temperature, with the aid of a catalyst formed by a manganic salt soluble in a mixture of crotonaldehyde and of glacial acetic acid.

In witness whereof I have hereunto signed my name this 28th day of May, 1921, in the presence of two subscribing witnesses.

THEODOR ODINGA.

Witnesses:
 FRIDA RURZ,
 AMAND RITTER.